UNITED STATES PATENT OFFICE.

FRANK W. MORRIS, OF VICTORIA, BRITISH COLUMBIA, CANADA.

PROCESS FOR THE PRODUCTION OF ALUMINIUM OXID.

No. 890,084.  Specification of Letters Patent.  Patented June 9, 1908.

Application filed March 13, 1907. Serial No. 362,218.

*To all whom it may concern:*

Be it known that I, FRANK W. MORRIS, citizen of the Dominion of Canada, residing at Victoria, in the Province of British Columbia, Canada, have invented a new and useful Improvement in a Process for the Production of Aluminium Oxid, of which the following is a specification.

This invention relates to a process for the production of aluminium oxid from any clay, or other material containing aluminium and is designed as a simple and inexpensive means for obtaining that product from such material which may have impurities which would otherwise be difficult to separate the aluminium from.

The invention is particularly described in the following specification, and its essential features claimed in the claims appended thereto.

The material containing aluminium with its common impurities is first treated with sulfuric acid to form sulfate of aluminium in the same manner as is commonly practiced in the production of alum.

The sulfate of aluminium with such of the impurities as are soluble in the acid is then charged into the anode compartment of an electrolytic cell the cathode compartment of which is charged with a saturated solution of a chlorid of an alkali metal such as sodium or potassium, the hydrate of which will when in excess dissolve aluminium hydrate. The cell must be of two compartments which may either be divided by a porous partition, or be separated by a partition the lower edge of which dips into a mercury seal as in the "Castner-Kellner" cell.

The cell may be in fact of any kind that will keep the contents of the two compartments separate without interfering with electrolytic action between them.

On a current being passed through a cell of this class so charged, the alkali chlorid is split up and chlorin is evolved at the anode. The alkali combines with the water forming alkali hydrate and hydrogen gas, which latter is evolved.

The aluminium and other bases forming impurities of the clay are transposed to the cathode compartment by electrolysis and under the action of the hydrate therein form hydrates of themselves. The hydrates of the iron and other impurities being insoluble in the alkali hydrate are precipitated. The aluminium hydrate which is soluble in the excess of alkali hydrate present under this process, is dissolved and forms an aluminate of the alkali used. The solution of aluminate of the alkali is then siphoned off from the cathode compartment, evaporated to dryness and calcined. This product is then lixiviated in any approved manner to recover the alkali leaving the pure oxid of aluminium as the desired product.

The sulfuric acid which has been used to dissolve the aluminium and other bases and which remains in the anode compartment is available for treating a further charge of the clay.

The anode will be necessarily of such material as will resist attack by the sulfuric acid and the chlorin, such as platinum or preferably graphitized carbon.

The cathode may be of iron as being highly electro-positive and not subject to attack by any of the constituents of the cathode compartment.

Having now particularly described my invention, I hereby declare that what I claim as new and desire to be protected in by Letters Patent, is:

1. A process for the production of aluminium oxid, comprising the electrolytic production of aluminium hydrate in a cell having a solution of a salt of an alkali metal in the cathode compartment and sulfate of aluminium with its commonly associated impurities in the anode compartment, the evaporation and calcination of the solution of the hydrate of aluminium and alkali hydrate resulting from such electrolytic action and the separation of aluminium oxid therefrom by lixiviation.

2. As a process for the production of aluminium oxid, the electrolytic production of aluminium hydrate in a cell having a solution of a salt of an alkali metal in the cathode compartment and sulfate of aluminium with its commonly associated impurities in the anode compartment, the evaporation and calcination of the solution of the hydrate of aluminium and alkali hydrate resulting, and the separation of aluminium oxid therefrom.

3. A process for the production of aluminium oxid, comprising the electrolytic production of aluminium hydrate in a cell having a solution of common salt in the cathode compartment and sulfate of aluminium with its commonly associated impurities in the anode compartment, the evaporation and calcination of the solution of the hydrate of aluminium and caustic soda resulting from such electrolytic action and the separation of the aluminium oxid therefrom by lixiviation.

4. A process for the production of aluminium oxid, comprising the electrolytic production of aluminium hydrate in a cell having a solution of common salt in the cathode compartment and sulfate of aluminium with its commonly associated impurities in the anode compartment, the evaporation and calcination of the solution of the hydrate of aluminium and caustic soda resulting, and the separation of the aluminium oxid therefrom.

5. A process of the class described, consisting in treating aluminiferous material with sulfuric acid to form aluminium sulfate, then electrolytically treating said aluminium sulfate in the presence of a suitable electrolyte to produce aluminium hydrate substantially as specified.

6. A process of the class described, consisting in treating aluminiferous material with sulfuric acid to form aluminium sulfate, then electrolytically treating said aluminium sulfate in the presence of a suitable electrolyte to produce aluminium hydrate, then treating said aluminium hydrate with an excess of an alkali hydrate to form an aluminate of such alkali, then evaporating such solution of aluminate of an alkali to dryness, substantially as specified.

7. A process of the class described, consisting in treating aluminiferous material with sulfuric acid to form aluminium sulfate, then electrolytically treating said aluminium sulfate in the presence of a suitable electrolyte to produce aluminium hydrate, then treating said aluminium hydrate with an excess of an alkali hydrate to form an aluminate of such alkali, then evaporating such solution of aluminate of an alkali to dryness, then calcining said dry material and lixiviating the same to recover the alkali and leave oxid of aluminium, substantially as specified.

8. A process of the class described, comprising the electrolytic production of aluminium hydrate, then treating said hydrate with an excess of alkali hydrate to form an aluminate of the alkali used and then evaporating and calcining the resultant product, and then treating it to separate aluminium oxid therefrom, substantially as specified.

9. A process of the class described, comprising the electrolytic production of aluminium hydrate and an alkali hydrate forming a solution of such hydrates, then evaporating the solution of hydrate of aluminium and alkali hydrate to dryness and calcining the resultant product, and then separating aluminium oxid therefrom by lixiviation, substantially as specified.

10. A process of the class described, consisting in first producing a sulfate of aluminium, then electrolytically producing aluminium hydrate in the presence of a solution of alkali metal while maintaining the solution separate from the aluminium sulfate, then evaporating the solution of hydrate of aluminium and alkali metal to dryness, calcining the resultant product and then separating aluminium oxid therefrom substantially as specified.

11. A process of the class described, comprising the electrolytic production of aluminium hydrate, the treatment of such hydrate with an excess of alkali hydrate to form an aluminate of the alkali used, and then producing aluminium oxid therefrom.

In testimony whereof I have signed my name to this specification in the presence of two subscribing witnesses.

FRANK W. MORRIS.

Witnesses:
  ROWLAND BRITTAIN,
  CLIVE S. CARMAN.